(12) United States Patent
Obermeier et al.

(10) Patent No.: US 6,620,011 B2
(45) Date of Patent: Sep. 16, 2003

(54) STRIP-SHAPED SCREW MAGAZINE

(75) Inventors: Josef Obermeier, Peiting (DE); Gerd Daubinger, Munich (DE)

(73) Assignee: Hilti Aktingesellschaft, Schaan (LI)

( * ) Notice: Subject to any disclaimer, the term of this patent is extended or adjusted under 35 U.S.C. 154(b) by 0 days.

(21) Appl. No.: 10/315,784

(22) Filed: Dec. 10, 2002

(65) Prior Publication Data
US 2003/0118424 A1 Jun. 26, 2003

(30) Foreign Application Priority Data
Dec. 20, 2001 (DE) .................................. 101 62 635

(51) Int. Cl.[7] ................................................ F16B 15/08
(52) U.S. Cl. ................................................ 441/442
(58) Field of Search .......................... 411/442, 443; 206/338, 343, 345, 346, 347

(56) References Cited

U.S. PATENT DOCUMENTS 3,904,032 A * 9/1975 Maier
3,955,674 A * 5/1976 Maier
5,803,691 A * 9/1998 Huang
6,036,013 A * 3/2000 Chen

* cited by examiner

Primary Examiner—Flemming Saether
(74) Attorney, Agent, or Firm—Sidley Austin Brown & Wood, LLP

(57) ABSTRACT

A strip-shaped screw magazine having a plurality of spaced from each other connection webs (2, 12, 22) extending between two side walls (1, 11, 21) of the magazine transverse to the longitudinal extent of the screw magazine and defining a plurality of substantially square chambers (9, 19, 29) for receiving each a screw (8, 18, 28), and a sleeve (6, 16, 26) for receiving a stem of the screw (8, 18, 28) and arranged centrally in each of the receiving chambers (9, 19, 29), the receiving sleeve (6, 16, 26) having at least two break points (5, 25) and being connected by at least two support arms (3, 13, 23) uniformly arranged on the circumference of the sleeve with the side walls and/or the connection webs.

10 Claims, 3 Drawing Sheets

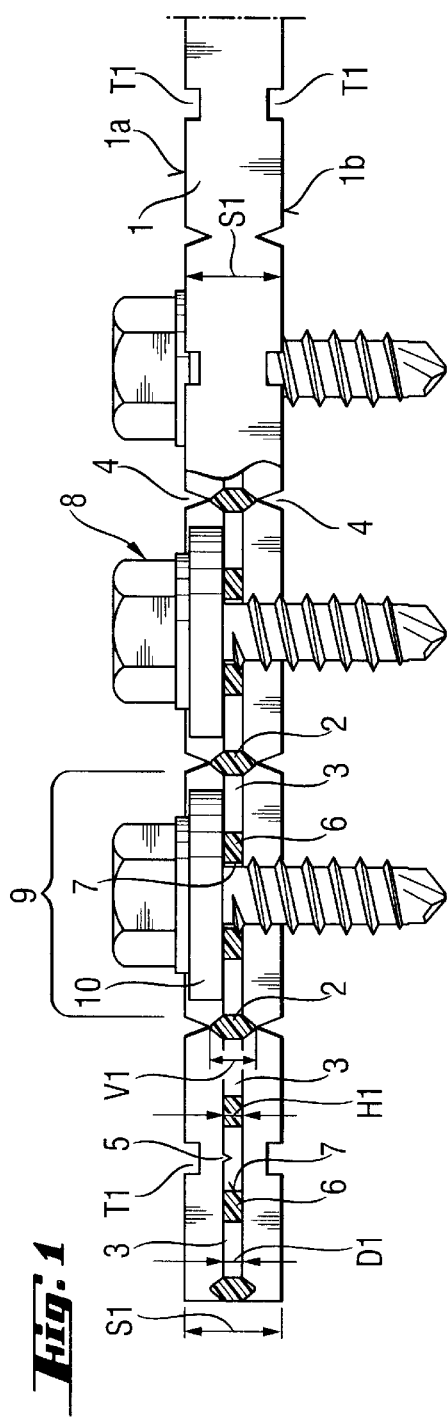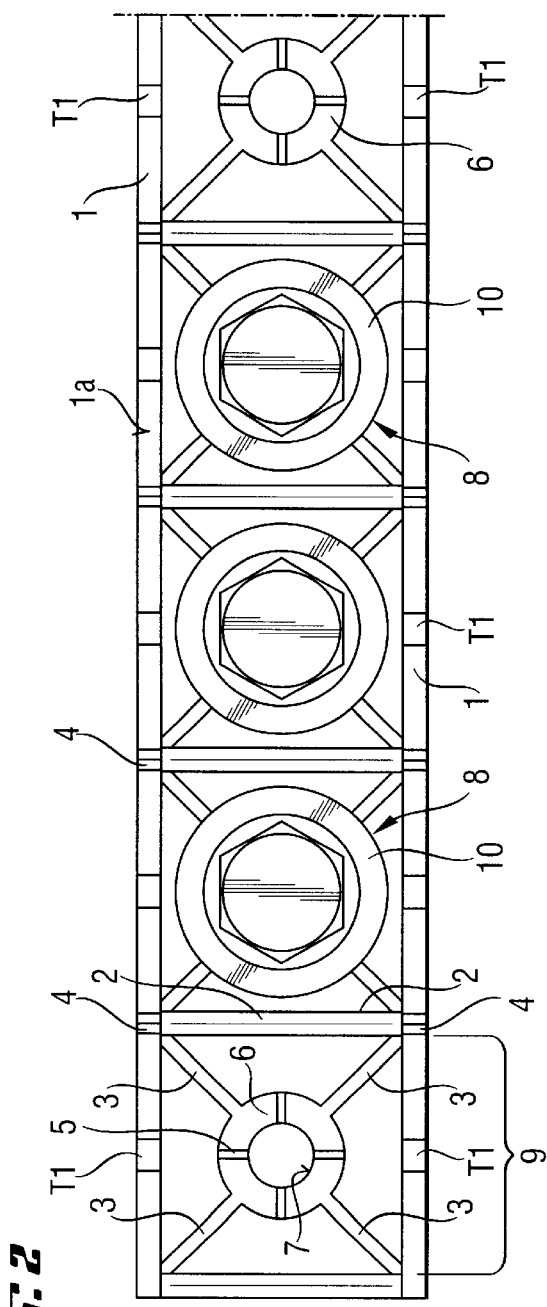

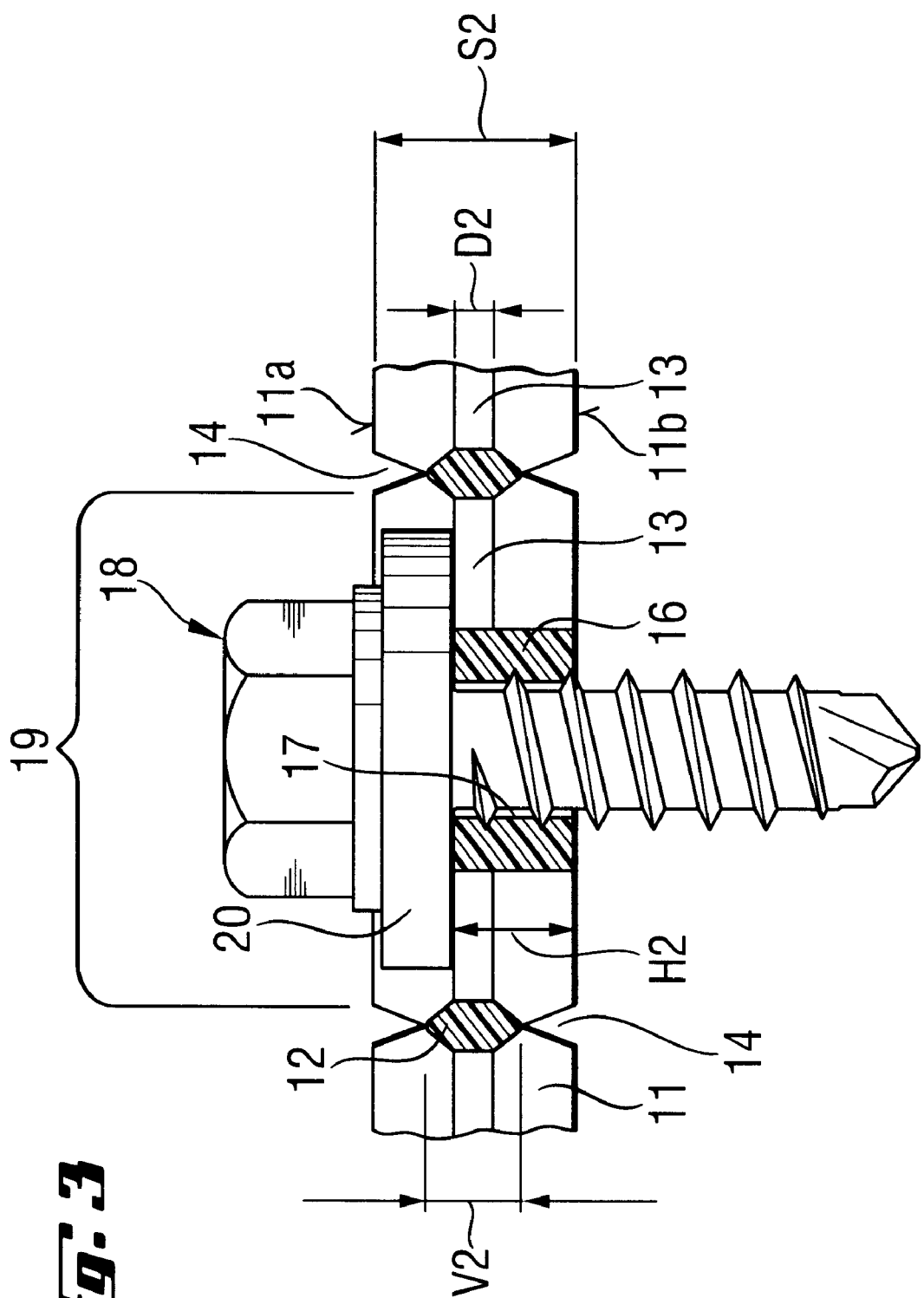

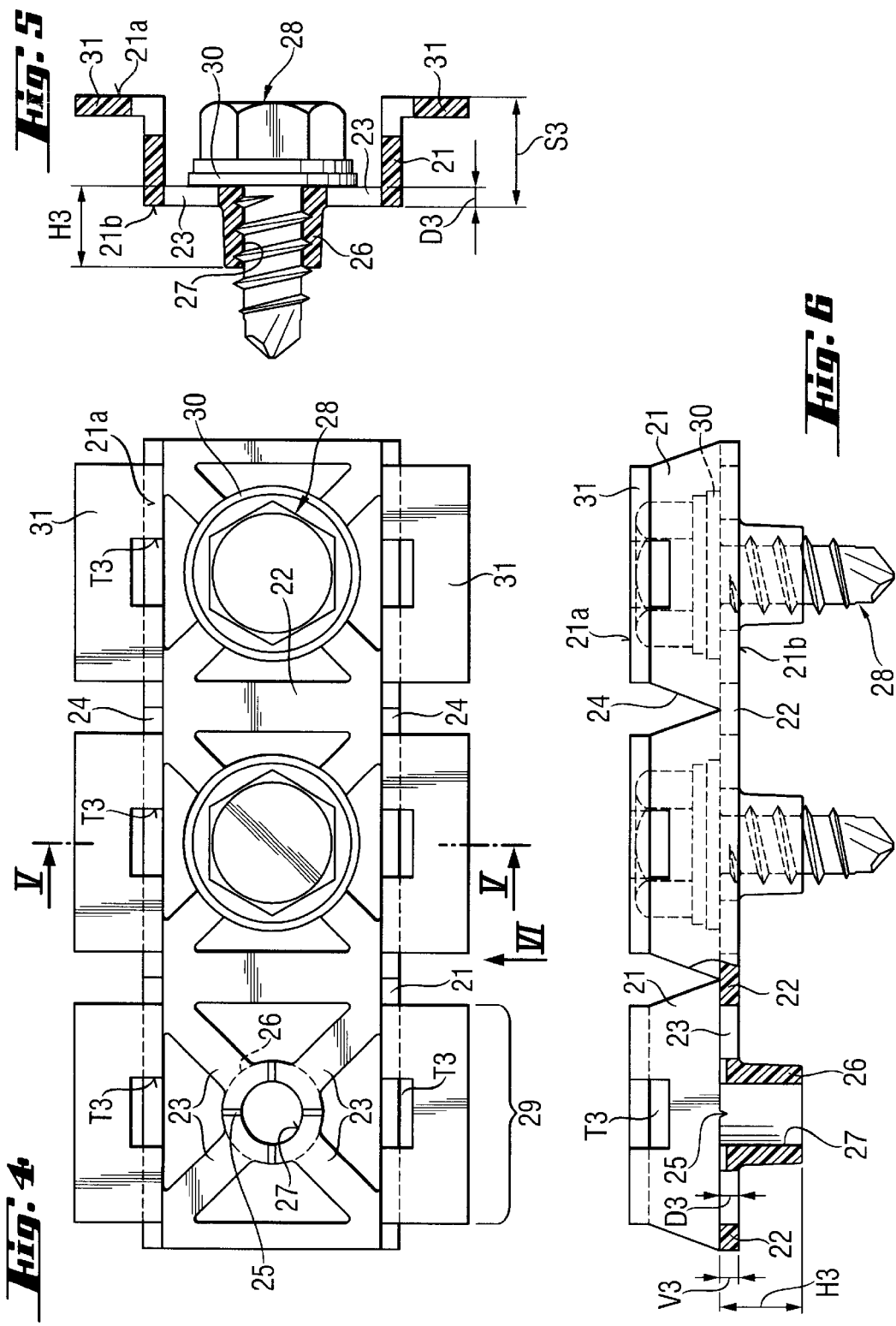

STRIP-SHAPED SCREW MAGAZINE

BACKGROUND OF THE INVENTION

1. Field of the Invention

The present invention relates to a strip-shaped screw magazine including a plurality of arranged one after another, chambers for receiving each a screw.

2. Description of the Prior Art

German Publication DE 296 19 321 discloses a strip-shaped screw magazine formed of a strip-shaped carrier having a plurality of spaced from each other, in the longitudinal direction of the magazine, chambers for receiving screws. Each of the receiving chambers has a bore for receiving the screw stem, and the diameter of which corresponds to the screw stem diameter. A plurality of elongate slots, which are uniformly distributed over the bore circumference, extend from the bore in the radial direction. The slots divide a portion of the strip surrounding the bore in four, substantially similar formed tongues which are bent elastically outwardly by the screw head when the screw is pushed through the screw magazine.

The drawback of the screw magazine of DE 296 12 321 consists in that the strip is easily elastically deformed in the direction parallel to the screw-in direction of the screws, and in that a substantial force is needed to withdraw a screw from the magazine.

The object of the present invention is to provide a strip-shaped screw magazine having a high stiffness in the direction parallel to the screw-in direction of the screws.

Another object of the present invention is to provide a strip-shaped screw magazine with which screws, which have a large head or which are provided with large-diameter washers or shims, can be withdrawn from the magazine, simply, easily and quickly.

SUMMARY OF THE INVENTION

These and other objects of the present invention, which will become apparent hereinafter, are achieved by providing a strip-shaped screw magazine including two, spaced from each other, side walls extending in a direction parallel to a longitudinal extent of the screw magazine, a plurality of spaced from each other connection webs extending between the two side walls transverse to the longitudinal extent of the screw magazine and defining a plurality of substantially square chambers for receiving each a screw, a sleeve for receiving a stem of the screw and arranged centrally in each of the receiving chambers, with the receiving sleeve having at least two break points, and at least two support arms uniformly arranged on a circumference of the receiving sleeve for connecting the receiving sleeve with the side walls or respective connection webs.

The side walls serve for absorbing pressure forces which act on the magazine when screws are withdrawn. The side wall have a substantially rectangular cross-section, with longitudinal sides of the cross-section extending parallel to the central axis of the receiving chamber. With a square-shaped chamber, the distance between the side walls and between the connection webs is larger than the largest diameter of the screw head or of a packing washer or a shim. Due to the break points provided on the receiving sleeve, which is arranged centrally in the receiving chamber, each sleeve can be separated from adjacent sleeves, which are likewise provided with break points, when a force is applied thereto, upon withdrawal of a screw, in the direction parallel to the longitudinal axis of the receiving chamber. The sleeve can have two, three or four break points. Each section of the sleeve can be connected with a support arm that is elastically bent by the screw head or by the washer or shim in the same direction in which a force acts on the receiving sleeve. It is possible to connect each sleeve section with two support arms.

In order to be able to easily bend off the support arms when the sleeve is broken often, the support arms should have a predetermined minimal length. The minimal length is provided when, preferably, each support arm is arranged diagonally and is connected with a corner of the receiving chamber. The diagonal arrangement of support arms provides for an increased free space for passage of the screw head or washer or shim with which a screw can be provided.

A stable guidance of a screw in the receiving chamber is achieved when the height of the receiving sleeve, which is measured in a direction parallel to a central axis of the receiving chamber corresponds at least to the thickness of a support arm likewise measured in the direction parallel to the central axis of the receiving chamber.

For manufacturing reasons, the height of each connection web, which is measured in the direction parallel to a central axis of the receiving chamber, corresponds at least to the thickness of a support arm likewise measured in the direction parallel to the central axis of the receiving chamber, and a height of each connection web, which is measured in a direction parallel to a central axis of the receiving chamber, corresponds at most to a height of a side wall likewise measured in the direction parallel to the axis of the receiving chamber.

A uniform deflection of the screw magazine, at the constant force application in two opposite directions, is advantageously achieved when the connection webs are centrally arranged with respect to the height of the side walls.

A screw magazine with a substantially U-shaped profile is obtained when the connection webs are connected with the side walls in the region of the longitudinal edges of the side walls.

For transporting the screw magazine, at least one longitudinal edge of at least one side wall is provided with a plurality of transporting notches.

An easy deflection of the screw magazine is achieved when both side walls are provided in the region of their edges in the region of the connection webs with an indentation.

Additional bearing or guide surfaces, which face in the drive-in direction of the screws, are formed by side flanges which adjoin the longitudinal edges of the side walls which are provided with indentations. The flanges can be shaped as strips cut in the region of respective indentations.

The side walls, the connection webs, and the support arms have substantially a rectangular cross-section. However, the connection webs and the support arms, in particular, can have a circular cross-section.

The support arms can so be formed that they break off or deflect when a screw is withdrawn from the screw magazine.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a side, partially cross-sectional view of a screw magazine according to the present invention;

FIG. 2 a plan view of the screw magazine shown in FIG. 1;

FIG. 3 a cross-sectional, partial, side view of another embodiment of a screw magazine according to the present invention;

FIG. 4 a plan view of a further embodiment of a screw magazine according to the present invention;

FIG. 5 a cross-sectional view along line V—V in FIG. 4; and

FIG. 6 a cross-sectional of the screw strip of the magazine shown in FIG. 4 in the direction of arrow VI.

DETAILED DESCRIPTION OF THE PREFERRED EMBODIMENTS

A strip-shaped screw magazine according to the present invention, which is shown in FIGS. 1–6, has a plurality of arranged one after another, receiving chambers 9, 19, 29.

Each of the receiving chambers 9, 19, 29 is designed for receiving a screw 8, 18, 28 having a washer 10, 20, 30. The receiving chambers 9, 19, 29 extent between two, spaced from each other, side walls 1, 11, 21 which extend parallel to the longitudinal extent of the screw magazine strip. A plurality of spaced from each other connection webs 2, 12, 22 extend between side walls 1, 11, 21 and perpendicular to the longitudinal extent of the screw magazine.

Each receiving chamber 9, 19, 29 has a substantially square shape and is provided in its central region with a receiving sleeve 6, 16, 26 for the stem of the screw 8, 18, 28. The inner diameter of the bores 7, 17, 27 of the receiving sleeve 6, 16, 26, respectively, substantially corresponds to the stem diameter of the screw 8, 18, 28. At least four, e.g., elastic support arms 3, 13, 23, which are uniformly distributed over the circumference of the receiving sleeve 6, 16, 26 connect the receiving sleeve 6, 16, 26 with four corners of the receiving chamber 9, 19, 29 formed by the opposite side walls 1, 11, 21 and the connection webs 2, 12, 22. Each receiving sleeve 6, 16, 26 has a predetermined breaking point 5, 25 that provides for a controlled separation of the receiving sleeve 6, 16, 26 when the screw 8, 18, 28, which is carried by the receiving sleeve 6, 16, 26, is pushed through the screw magazine.

A stable guidance of the screw 8, 18, 28 in the receiving sleeve 6, 16, 26 is achieved when the height H1, H2, H3 of the receiving sleeve 6, 16, 26, measured in a direction parallel to the central axis of the receiving chamber 9, 19, 29, corresponds at least to the thickness D1, D2, D3 of the support arm 3, 13, 23 which is measured in the same direction. As it is particularly shown in FIG. 3, the height H2 of the receiving sleeve 16 can be greater than the thickness D2 of the support arm 13 and can project beyond the support arm 13 in the direction parallel to the central axis of the receiving chamber 19. For manufacturing reasons, the height V1, V2, V3 of the connection, web 2, 12, which is measured in the direction parallel to the central axis of the receiving chamber 9, 19, 29, corresponds to the thickness D1, D2, D3 of the support arm 3, 13, 23 measured in the same direction. FIG. 5 shows a screw magazine in which the height V3 of the connection web 22 corresponds to the thickness 23 of the support arm 23. The connection webs 2, 12, which is measured in the direction parallel to the central axis of the receiving chamber 9, 19, 29, corresponds to the thickness D1, D2, D3 of the support arm 3, 13, 23 measured in the same direction. FIG. 5 shows a screw magazine in which the height V3 of the connection web 22 corresponds to the thickness D3 of the support arm 23.

The connection webs 2, 12, shown in FIGS. 1 and 3, respectively, have a height V1, V2 greater than the thickness D1, D2 of respective support arms 3, 13.

In order to provide for a good torsional stiffness of the strip-shaped screw magazine, the height V1, V2, V3, which is measured in the direction parallel to the central axis of the receiving chamber 9, 19, 29 of the connection web 2, 212, 22 is so selected that it corresponds at most to the height S1, S2, S3 of the side wall 1, 11, 21 measured in the same direction.

The connection webs 2, 12 are arranged in the middle with respect to the height S1, S2 of respective side walls 1, 11, as shown in FIGS. 1 and 3. FIGS. 4–6 show a screw magazine in which the connection webs 22 are connected with the side walls 21 in the region of longitudinal edges 21b of the side walls 21.

In order to be able to transport the screw magazine with a mechanical transporting device (not shown), at least one longitudinal edge 1a, 21a of at least one of the side walls 1, 21 is provided with transporting notches T1, T3.

In order to provide for a controlled deflection of the screw magazine, at least, e.g., longitudinal edges 1a, 1b; 11a, 11b, 21a, 21b of both side walls 1, 11, 21 and which extend in the same direction, are provided, in the region of the connection webs 2, 12, 22, with an indentation 4, 14, 24.

Additional guide surfaces on the screw magazine are formed, e.g., by side flanges 31 which project in the direction parallel to the longitudinal extent of the screw magazine from at least one of the side edges 21a on which the indentations 24 are formed. The flanges 31 extend from the respective indentations 24.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A strip-shaped screw magazine, comprising two, spaced from each other, side walls (1, 11, 21) extending in a direction parallel to a longitudinal extent of the screw magazine; a plurality of spaced from each other connection webs (2, 12, 22) extending between the two side walls (1, 11, 21) transverse to the longitudinal extent of the screw magazine and defining a plurality of substantially square chambers (9, 19, 29) for receiving each a screw (8, 18, 28); a sleeve (6, 16, 26) for receiving a stem of the screw (8, 18, 28) and arranged centrally in each of the receiving chambers (9, 19, 29), the receiving sleeve (6 16, 26) having at least two break points (5, 25); and at least two support arms (3, 13, 23) uniformly arranged on the circumference of the receiving sleeve (6, 16, 26) for connecting the receiving sleeve (6, 16, 26) with at least one of the side walls (1, 11, 21) and /or one of the connection webs (2, 12, 22).

2. A screw magazine according to claim 1, wherein each support arm (3, 13, 23) is connected with a corner of the receiving chamber (9, 19, 29).

3. A screw magazine according to claim 1, wherein a height (H1, H2, H3) of the receiving sleeve (6, 16, 26), which is measured in a direction parallel to a central axis of the receiving chamber (9, 19, 29) corresponds at least to the thickness (D1, D2, D3) of a support arm (3, 13, 23) likewise measured in the direction parallel to the central axis of the receiving chamber (9, 19, 29).

4. A screw magazine according to claim 1, wherein a height (V1, V2, V3) of each connection web (2, 12, 22), which is measured in the direction parallel to a central axis of the receiving chamber (9, 19, 29), corresponds at least to a thickness (D1, D2, D3) of a support arm (3, 13, 23) likewise measured in the direction parallel to the central axis of the receiving chamber (9, 19, 29).

5. A screw magazine according to claim 1, wherein a height (V1, V2, V3) of each connection web (2, 12, 22), which is measured in a direction parallel to a central axis of the receiving chamber (9, 19, 29) corresponds at most to a height (S1, S2, S3) of a side wall (1, 11, 21) likewise measured in the direction parallel to the axis of the receiving chamber (9, 19, 29).

6. A screw magazine according to claim 1, wherein the connection webs (2, 12) are arranged centrally with respect to a height (S1, S2) of the side walls (1, 11).

7. A screw magazine according to claim 1, wherein the connection webs (22) are connected with the side walls (21) in a region of a longitudinal edge (21*b*) of the side wall (21).

8. A screw magazine according to claim 1, wherein at least one longitudinal edge (1*a*, 21*a*) of at least one side wall (1, 21) has a plurality of transporting notches (T1, T3).

9. A screw magazine according to claim 1, wherein longitudinal edges (1*a*, 1*b*; 11*a*, 11*b*; 21*a*, 21*b*) of both side walls (1, 11, 21) and which extend in the same direction, are provided in a region of the connection webs (2, 12, 22) with an indentation (4, 14, 24).

10. A screw magazine according to claim 9, wherein a side flange (31) projects from at least one of two edges of a side wall (1, 11, 21) in which the indentation (4, 14, 24) is provided, the flange (31) being cut in a direction parallel to a longitudinal extent of the screw magazine in the region of the indentation (4, 14, 24).

* * * * *